US008643725B1

(12) United States Patent
Biagiotti et al.

(10) Patent No.: US 8,643,725 B1
(45) Date of Patent: Feb. 4, 2014

(54) METHOD AND SYSTEM FOR VALIDATING VIDEO APPARATUS IN AN ACTIVE ENVIRONMENT

(71) Applicant: Advanced Testing Technologies, Inc., Hauppauge, NY (US)

(72) Inventors: William Biagiotti, St. James, NY (US); Eli Levi, Dix Hills, NY (US)

(73) Assignee: Advanced Testing Technologies, Inc., Hauppauge, NY (US)

( * ) Notice: Subject to any disclaimer, the term of this patent is extended or adjusted under 35 U.S.C. 154(b) by 0 days.

(21) Appl. No.: 13/781,899

(22) Filed: Mar. 1, 2013

Related U.S. Application Data

(60) Provisional application No. 61/609,399, filed on Mar. 12, 2012.

(51) Int. Cl.
*H04N 17/02* (2006.01)
*G08B 21/00* (2006.01)

(52) U.S. Cl.
USPC .......................................... 348/184; 340/945

(58) Field of Classification Search
USPC ......... 348/180, 181, 189–191, 115, 117, 121, 348/113, 118, 123, 124, 184, 129; 340/937, 340/945; 365/5
See application file for complete search history.

(56) References Cited

U.S. PATENT DOCUMENTS

| | | | | |
|---|---|---|---|---|
| 4,884,145 | A * | 11/1989 | Kaye et al. | 348/189 |
| 5,572,444 | A * | 11/1996 | Lentz et al. | 702/117 |
| 5,638,461 | A * | 6/1997 | Fridge | 382/141 |
| 6,396,536 | B1 | 5/2002 | Howell et al. | |
| 7,180,477 | B2 | 2/2007 | Howell | |
| 7,180,530 | B2 * | 2/2007 | Whittington et al. | 345/690 |
| 7,253,792 | B2 | 8/2007 | Biagiotti et al. | |
| 7,289,159 | B1 | 10/2007 | Biagiotti et al. | |
| 7,495,674 | B2 | 2/2009 | Biagiotti et al. | |
| 7,768,533 | B2 | 8/2010 | Biagiotti et al. | |
| 7,978,218 | B2 | 7/2011 | Biagiotti et al. | |
| 8,300,153 | B2 | 10/2012 | Engel et al. | |
| 2004/0179603 | A1 * | 9/2004 | Kamisuwa | 375/240.16 |
| 2007/0085906 | A1 * | 4/2007 | Hill et al. | 348/130 |
| 2007/0195209 | A1 * | 8/2007 | Cheng | 348/745 |
| 2007/0236366 | A1 * | 10/2007 | Gur et al. | 340/945 |
| 2010/0214130 | A1 * | 8/2010 | Weinmann et al. | 340/945 |
| 2010/0214418 | A1 * | 8/2010 | Germain | 348/189 |

* cited by examiner

*Primary Examiner* — Victor Kostak
(74) *Attorney, Agent, or Firm* — Brian Roffe

(57) ABSTRACT

Method and system for validating video monitors, gauges, indicators and controls within their installed environment is disclosed. The methods do not require access to the electronic signals that control or stimulate those devices. Direct visual capture of the instruments under test is provided along with a novel sequence of operations to compare the present visual presentation to a known-good reference image and optionally, to known-bad reference images. When the method is applied to complex and interconnected systems, such as aircraft cockpits, tangible benefits are realized, including minimizing equipment removal and quicker fault isolation.

22 Claims, 4 Drawing Sheets

METHOD AND SYSTEM FOR VALIDATING VIDEO APPARATUS IN AN ACTIVE ENVIRONMENT

CROSS REFERENCE TO RELATED APPLICATION

This application claims priority under 35 U.S.C. §119(e) of U.S. provisional patent application Ser. No. 61/609,399 filed Mar. 12, 2012, now abandoned, incorporated by reference herein.

FIELD OF THE INVENTION

The present invention relates generally to the field of automatic test equipment for the testing of electronic signals generated by equipment under test including, but not limited to, complex video signals. More specifically, the present invention relates to a method and system for determining the validity of video monitors and their associated systems in various environments, including what are considered difficult environments such as a jet fighter cockpit, without disconnecting and removing the constituent electronic modules.

BACKGROUND OF THE INVENTION

Automatic test equipment for the testing and measuring of electronic signals and electronic video signals is known to those skilled in the art to which the invention pertains. Electronics is one of the primary markets for automatic test equipment and drives much innovation in this realm due to constantly evolving and demanding requirements. Electronics are universally installed on numerous commercial and military platforms including automobiles, jet fighters, helicopters, tanks and other mobile vehicles. Often, in-place testing of such electronics is not always supported with a sufficient built-in test function (commonly referred to as a BIT function) and system trouble reports require time consuming instrument (UUT) removal from the platform. The situation becomes even more complex when an interconnected system is failing and all of the constituent modules of the system must be removed for bench testing. Radar displays or multi-function displays are examples of such an interconnected system.

Portable automatic test equipment for the testing of video devices is also known to those skilled in the art to which the invention pertains. Such test equipment requires a physical electrical connection to the unit or units under test (UUT) in order to capture a video signal and/or generate a video signal. In instances where physical connections are not possible, typical presently available portable automatic test equipment is unable to perform its mission.

Accordingly, there exists a need to provide a new method that does not require physical electrical connections to the video or indicator system and can still identify and verify images from these indicators. Such a method would reduce unnecessary UUT removal, thereby producing measurable economic and time savings.

SUMMARY OF THE INVENTION

A portable automatic video device tester with an optical imaging ability, e.g., a camera, is disclosed. This tester combines a portable computer, novel software embodied on computer-readable media with automatic scale transformation algorithms and electronic template comparison technology, a video acquisition function and a high resolution camera with versatile mounting options.

There are technical difficulties to overcome when capturing an image with a camera, or other optical imaging device, that is arbitrarily aimed at a target image. Without precision alignment of the camera to the target image, there will be scale distortions in the captured image and a linear comparison between the captured image and a predetermined reference image cannot be successfully performed. Complicating the matter further, the environment in which this testing is to be performed, mobile vehicles and aircraft, is not designed to allow any form of secure mechanical attachment for a camera.

To overcome these limitations, the present invention includes a camera designed with one of several possible mounting options including a custom-fit handheld shroud with integrated camera mount, a universal seat mount which mounts the camera to any available seating surface, or a user-wearable helmet with integrated camera which an operator would wear while sitting in the area where the video monitor would normally be viewed from.

The video acquisition function of the video device tester will capture the video signal coming from the camera, without being physically electrically connected thereto, and forward it to the tester software associated with the video device tester. The tester software is responsible for programmatically mapping the captured image from the camera to a predetermined reference image for the specific monitor or video device whose screen is being imaged by the camera (i.e., calculating a transformation matrix), comparing the captured mapped image to the reference image and determining the validity of the video device. Optionally, if the captured image fails validity, the tester software can search a reference library containing images with known anomalies in an attempt to diagnose the fault and recommend the proper module removal/repairs.

While a preferred application of the portable video device tester in accordance with the invention is verification of video monitors and subsystems, the tester is also well suited for the testing and validation of non-video indicators or an orientation validation of manual controls, such as performed during an aircraft preflight check.

Also disclosed is a portable analyzer for testing a unit under test, the unit being a video monitor, an indicator or a gauge. The portable analyzer includes a portable chassis, a high resolution camera, a video acquisition module arranged on the chassis and coupled to the camera, a memory component including a reference image library, and a processor coupled to the video acquisition module and configured to command the video acquisition module to initiate the camera to obtain at least one image of the unit under test and perform analysis of the obtained image(s) relative to one or more images in the reference image library to assess functionality of the unit under test. The portable analyzer also includes a portable computer monitor coupled to the processor on which information about the assessed functionality of the unit under test is provided, and a mounting structure, arrangement, device, system or means for mounting the camera in a fixed position in front of the unit under test. The mounting means include whatever structure is disclosed herein that contributes to the mounting of the camera in a fixed position in front of the unit under test.

In one embodiment, the mounting means include a shroud attached at one end to the camera and having an opening at an opposite end adapted to fit exactly over the unit under test. The shroud may be rigid and made of opaque material. In another embodiment, the mounting means include a base adapted to be placed on a seating surface or other rigid surface, at least one strap for securing the base to the seating surface, and an extendable arm attached to the base and to the camera to enable movement of the camera relative to the unit under test. In another embodiment, the mounting means include a helmet, the camera being integrated into the helmet.

BRIEF DESCRIPTION OF THE DRAWINGS

A more complete appreciation of the present invention and many of the attendant advantages thereof will be readily understood by reference to the following detailed description of the invention when considered in connection with the accompanying drawings in which.

DETAILED DESCRIPTION OF PREFERRED EMBODIMENTS

For the purposes of the following description, reference will be made to a 'cockpit' as the location where the invention will be performing its primary function. This terminology is used to illustrate an exemplifying application of the method and system in accordance with the invention within an applicable environment in which the equipment to be tested is mounted and is not intended to limit the scope of this invention in any way.

Figure 1:
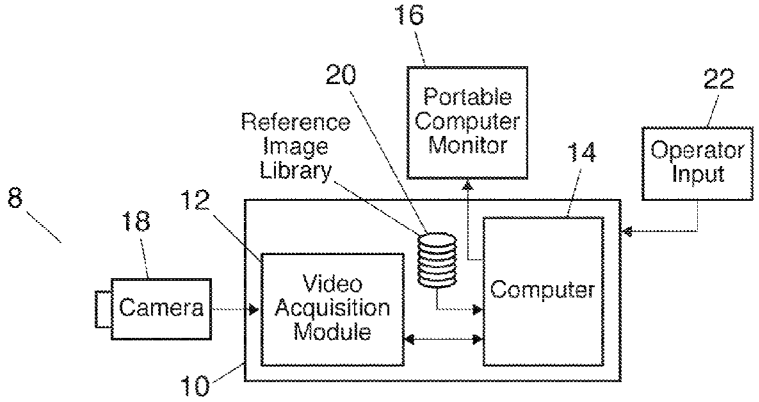
FIG. 1 illustrates a function overview of a video tester in accordance with the invention.

Referring to the accompanying drawings wherein the same reference numerals refer to the same or similar elements, a portable automatic video test analyzer in accordance with the invention is generally designated as 8 and generally includes either only partly or in its entirety, concepts from a Programmable Video Generator and Analyzer (PVGA/ePVGA), such as the type disclosed in the current assignee's U.S. Pat. No. 6,396,536 incorporated by reference herein in its entirety (shown in FIG. 1). In preferred embodiments, the video test analyzer 8 includes a video acquisition module 12, a processing unit (computer) 14, a portable computer monitor 16, a high resolution camera 18 with one or multiple mounting methods described below, a reference image library 20 embodied on one or more memory components, and proprietary software algorithms embodied on conventional physical components accessible by, for example, the computer 14. The video acquisition module 12, computer 14 and reference image library 20 may be housed in a common, portable chassis or housing 10, sometimes referred to herein as the tester. The tester 10 is coupled to the portable computer monitor 16, the camera 18 and the user interfaces 22 in a manner known to those skilled in the art. The reference image library 20 may be considered a repository in which reference images are stored. The reference images in the reference image library may be stored on any type of computer storage medium or memory component that forms a physical part of the reference image library 20, whether a single such medium or component, multiple media and components or combinations thereof.

The computer 14 performs numerous functions, including but not limited to, conducting all test operations and displaying user prompts, visual image feedback and test results on the portable computer monitor 16. Operator input to the computer 14 is transferred via, but not limited to, conventional means of computer control such as keyboard, touch screen, or mouse. Such device for effecting control over the computer 14 are often referred to as user interface devices or user interface means and represented by box 22 in FIG. 1. The high resolution camera 18 connected to the video acquisition module 12, is the source of visual information for the video test analyzer 8. The camera 18 may supply imagery in any analog or digital format, such as DVI, RGB, NTSC, etc. that is supported by the video acquisition function of the video test analyzer 10, as well as in multiple ones of these formats. The invention places no limitation on the image format that is utilized providing that it supports resolution at least equivalent to the reference images contained in the reference image library 20. High resolution camera 18 may be any commercially available high resolution camera or any other known optical imaging system that can provide images with the necessary clarity at a range within the distance between the camera 18 and the monitor or indicator under test. Possible cameras 18 for use in the invention will therefore depend on the expected distance between the camera 18 and the object being imaged.

In a preferred embodiment, a technician using the video test analyzer 8 will select the monitor or indicator to-be-tested from a visual menu presenting available choices on the computer monitor 16. In some embodiments, there will be more than one independent image for a given monitor or indicator, depending upon the present mode of operation of the monitor system. The technician may select the proper anticipated image or may select a feature that will have a software program executed by the video test analyzer 8 search all available images in the tester's reference image library 20 for a match when the test image is captured by the high resolution camera 18. This software program may be embodied in usual physical componentry, either physically present in the video test analyzer 8 or available using a communications network, and is made accessible to the computer 14.

Figure 3:
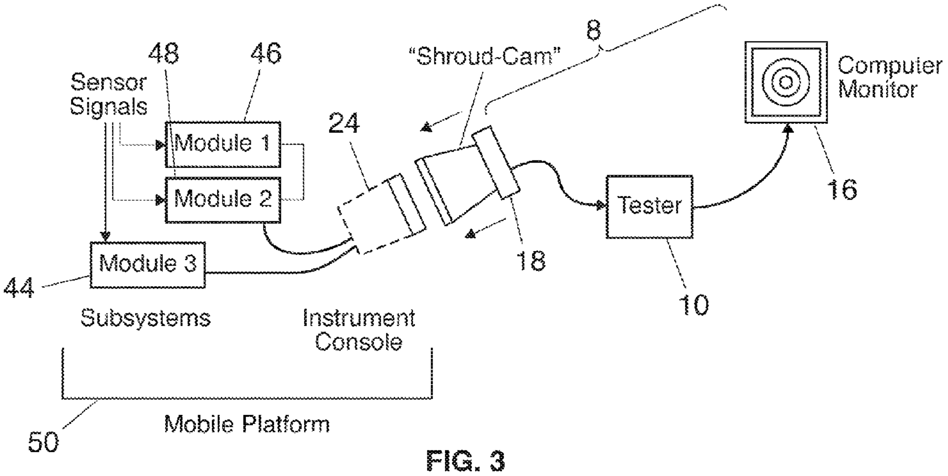
FIG. 3 illustrates a typical application of the video tester in accordance with the invention.

Referring to FIG. 3, the high resolution camera 18 will be aimed toward the monitor-under-test 24 and a field-of-view of the high resolution camera 18 aligned using one of several novel mounting options. Due to unpredictable spatial dimensions and variations within the physical testing environment of vehicle cockpits, it was anticipated that having a single mounting solution would not be sufficient for all applications. The invention provides a unique selection of three mounting options which is expected to cover all known situations. These three mounting options are non-limiting examples of mounting means for mounting the camera 18 in a fixed position in front of the monitor or other unit under test 24. The invention places no limitations on the number of mounting options, and additional and different, and combined, mounting options are contemplated by the inventors to be within the scope and spirit of their invention.

Figure 2A:
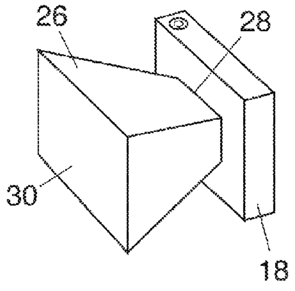
FIGS. 2A, 2B and 2C illustrate the Shroud-cam, Seat-cam and Helmet-cam options of the Video Tester camera in accordance with the invention, respectively.

Referring to FIG. 2A, the first mounting option is an opaque, rigid shroud 26 which has a secure attachment for the camera 18 on one end and a custom-fitted opening on the other end which is sized to fit exactly over the video monitor 24 to be tested. There are several significant advantages and benefits of the shroud 26 including, that the camera 18 can be mounted at a known focal distance and centered over the face of the video monitor 24, background light is completely blocked by the shroud 26 and the construction of the shroud 26 allows for convenient ergonomic handling of the camera

18. The latter aspect is facilitated by the construction of the shroud 26 with the secure attachment means 28 for the camera 18 on one end and a custom-fitted opening 30 on the other end which is sized to fit exactly over the video monitor 24 to be tested. The shroud 26 is handheld by the operator using an integral grip with a built-in shutter trigger (not shown).

Figure 2B:
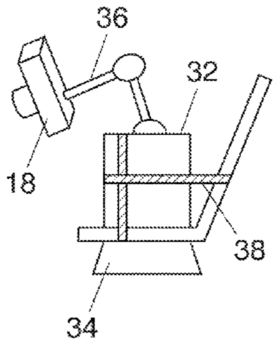

Referring to FIG. 2B, a second mounting option uses a flexible base 32 which is placed on a seating surface 34 or other rigid surface within the cockpit, or other environment of the monitor being tested 24. One or more straps 38, or other comparable securing means, secure the base 32 on the seating surface 34. The camera 18 is mounted on an extendable arm 36 with three axes of movement so that the camera 18 may be maneuvered into position directly in front of the target monitor. As the camera 18 is being manually positioned, a continuous image from the camera 18 is being captured and displayed on the computer's monitor 16 to give the operator positioning feedback. A positioning grid may be superimposed on the computer monitor 16 to aid the operator when aligning the camera's field-of-view.

Figure 2C:
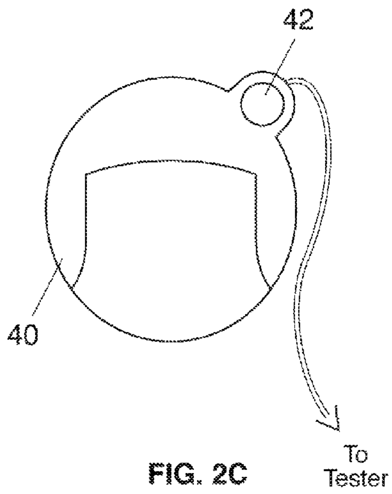

Referring to FIG. 2C, a third mounting option requires the technician to wear a helmet 40 with an integrated camera 42 and to sit in the operational seat of the platform. The technician will be prompted by the video test analyzer 8 to direct his vision toward the monitor 24 under test and align the camera's actual viewpoint via live feedback with a superimposed positioning grid on the computer monitor 16.

Referring again to FIG. 3, the mobile platform 50 that includes the monitor being tested 24 also includes module 44, 46, 48 provided with sensor signals. The invention does not require these modules 44, 46, 48 to be separated from the mobile platform 50 in order to test the monitor 24. Thus, the mobile platform 50 remains in its operational condition with its constituent modules in place and electrically and physically connected to the monitor 24, while the invention is applied on the output side of the monitor 24, i.e., the high resolution camera 18 is oriented to image the screen of the monitor 24.

An exemplifying method for using the video test analyzer 8 described above is shown in flow chart form in FIG. 4.

Once the camera apparatus of any of the configurations shown in FIGS. 2A, 2B and 2C is in-place and aligned (step 52), the technician will initiate the image acquisition function of the video test analyzer 8, for example, via manual control or voice activation (step 54). The video test analyzer 8 will immediately capture the full image from the camera 18. In order to compare the captured image to a reference image from the reference image library 20, the software in the video test analyzer 8 will search both the captured image and a selected one of the reference images from the reference image library 20 to identify obvious reference points (steps 56, 58). In a preferred embodiment, the obvious reference points will be the edges of the illuminated display which will be identified by the demarcation (threshold) between the illuminated display and the non-illuminated display bezel. The invention allows either distinct reference points or a continuous line of reference points to be identified. The reference points within the captured image will be in close proximity to the same reference points in the reference image allowing reference point mapping with a local linear data search. Once the reference points have been matched, the X and Y axis data values (location) are compared and a transformation matrix is developed, for example, by software within the video test analyzer 8, for the entire coordinate range of data points (step 60). Finally, the test image is reordered using the transformation matrix and saved into temporary storage in a storage or memory component of or associated with the video test analyzer 8 (step 62) for the next stage, i.e., image comparison (step 64).

The method of image comparison, step 64, utilizes concepts described in, for example, U.S. patent application Ser. No. 13/238,588 assigned to the current assignee, and which is incorporated by reference herein. Specifically, the image pixels of both the test image and the reference image are concatenated (respectively) and treated as analog waveforms. As defined in the '588 application, a pair of upper and lower timing-vs.-voltage limit lines may be defined from the basis reference image by specifying an allowable amplitude tolerance value (Y axis) and adding/subtracting it from every pixel value. Furthermore, a position (X axis) tolerance is defined by shifting each pixel value right and left and calculating minimum and maximum pixel values at each location. It is anticipated that the transformation matrix described above will not always produce a perfect pixel-to-pixel matrix.

The comparison method defined in the '588 application allows for a tolerant data comparison that would not have otherwise been possible. If the comparison results in a successful status, as defined by two statistics (number of pixels failing on a line, number of lines failing in the overall image), then the tested image is reported as passing, step 66. This is considered a validation of the monitor being tested, or other indicator, control or gauge being tested.

If the comparison results in a failing status, the method may terminate here or, if available in the tester's reference library 20, other known-bad reference images could be compared to the test image (step 68). If a tolerant match is found, the report and/or documented details attached to or associated with the known-bad reference image is/are reported to the technician as a guide to assist in the repair effort (step 70). This report may be made on the portable computer monitor 16 or through any technique to notify the technician of a possible repair solution.

In a preferred embodiment, the known-bad reference images are generated from previously executed tests and saved to the reference image library 20 with an accompanying report detailing the details of the cause of the problem. Documented details include, but are not limited to, which module(s) failed, which component(s), time of repair, and prior symptoms of the problem. If the reference image library 20 does not contain any known-bad reference images for the monitor, the video test analyzer 8 will enter the current test image into the reference image library 20.

There are multiple benefits of this invention over other legacy methods. As stated, the unit or equipment under test does not require removal or electrical access to perform the test. Also, in event of a suspected failure, the comparison to known-bad reference images stored in the reference image library 20 results in a reduction of unnecessary module removal for repair by utilizing the documentation associated with the known-bad reference image and stored in a memory component accessible upon access to the known-bad reference images. Additionally, this invention can universally test monitors of all video formats including composite video, raster video and stroke video and all monitor technologies, such as CRT and LCD displays, resulting in economic savings through a reduction in required testing equipment. Furthermore, non-video devices, such as dial and gauges may be also interrogated with this method.

The basic structure of the tester described above can be readily modified to suit any given set of requirements or configurations. For instance, the video test analyzer 8 could be constructed as individual modules in a VXI, PXI or other format chassis. In other embodiments, the computer 14 may be a laptop, tablet or other external computing device. Additionally, improvements and variations could be made to the camera mounting mechanisms described in connection with FIGS. 2A, 2B and 2C, as required for utilization in different testing environments. For instance, the camera 18 could be mounted to the rear bulkhead of an aircraft cockpit with a complete view of all cockpit controls and indicators. A quick and complete verification could be made by the video test analyzer 8 as part of, or in partial or complete replacement of, a manual pre-flight check. While newer commercial aircraft may offer this feature natively, older commercial aircraft and most personal craft rely on manual verification exclusively. This permutation of the invention offers obvious important safety benefits. As such, a retrofit technique is encompassed by the invention wherein an existing aircraft cockpit is renovated by installing one or more cameras, each in a position imaging a part of all of the instrument panel, and other structure to enable images of the controls of the instrument panels in the images being obtained by the camera(s) to be analyzed in the manner described herein. This image analysis can assess the functionality and/or correct position/placement of the controls.

Figure 5:
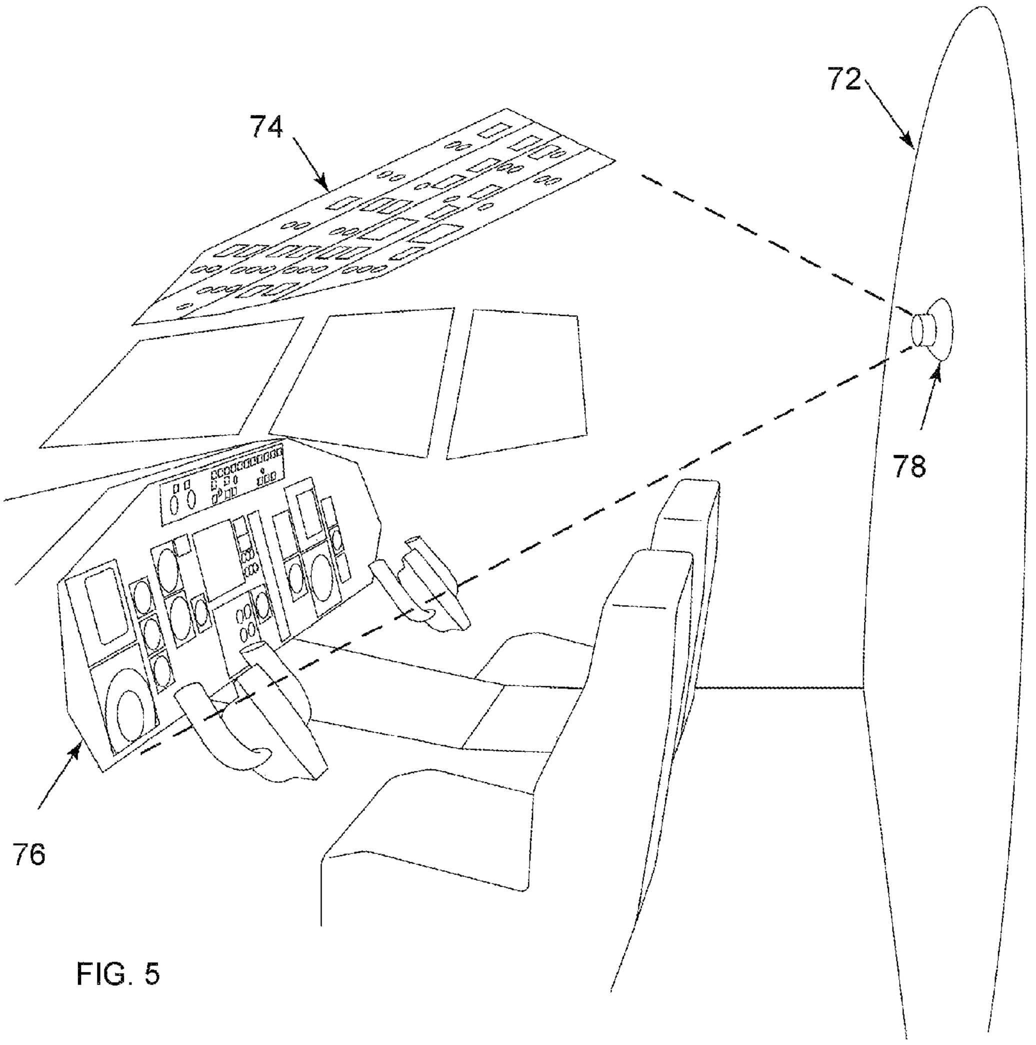
FIG. 5 is a schematic of an airplane cockpit showing a bulkhead-mounted camera for use in an embodiment of the invention.

In this regard, FIG. 5 shows an airplane cockpit with a bulkhead 72, an overhead instrument panel 74, a front instrument panel 76 and a camera 78 mounted on the bulkhead 72. Camera 78 is, in accordance with the invention, positioned and configured to view both the instrument panels 74, 76 (its field of view is indicated by the dotted lines emanating from the forward lens of the camera 78). In this manner, the camera 78 can obtain images of any one of the controls on the instrument panels 74, 76, or multiple controls thereon, and analyze the content and/or position of the controls via the video test analysis techniques described herein.

Figure 6:
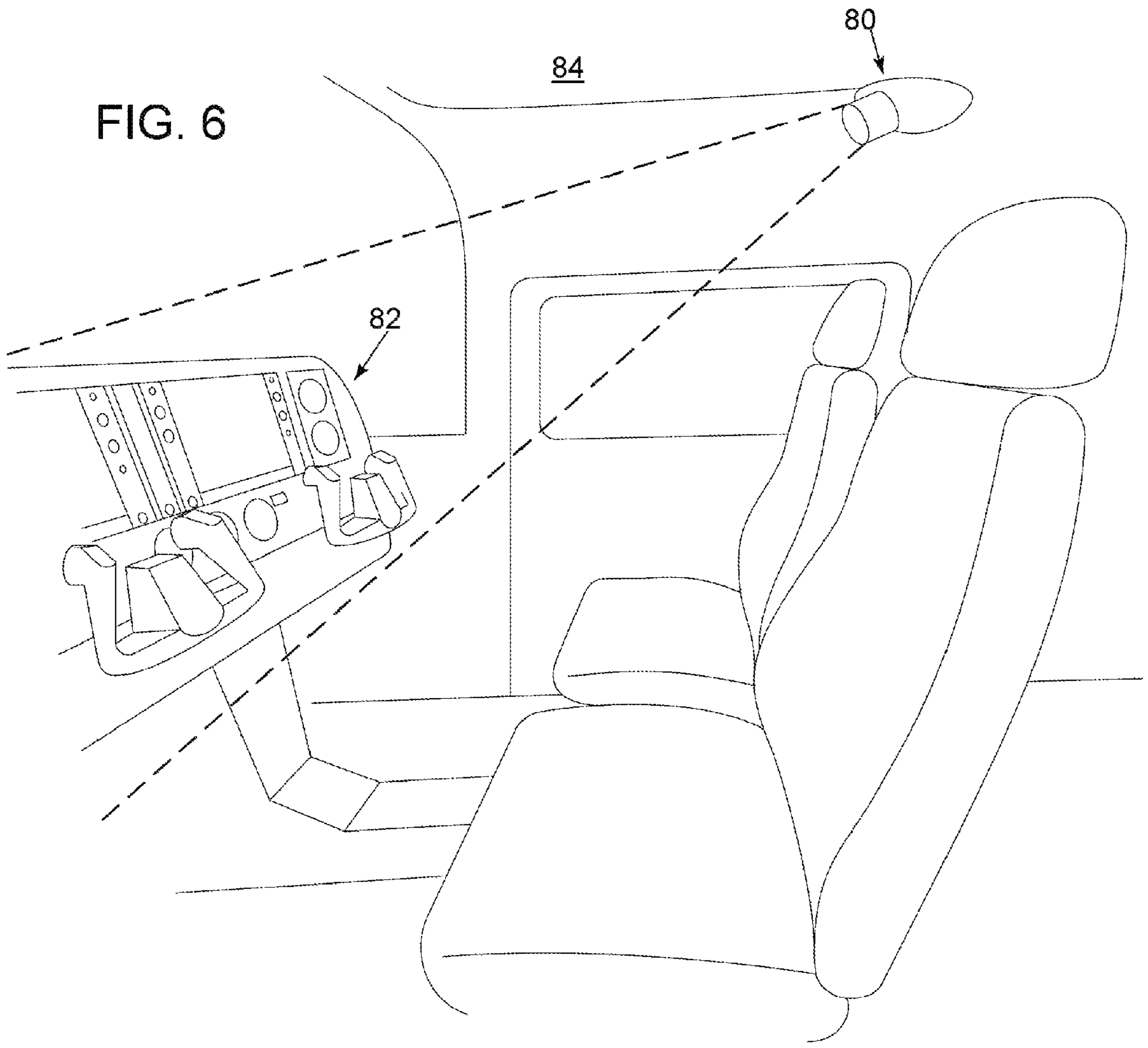
FIG. 6 is a schematic of a cockpit of an airplane showing a ceiling-mounted camera for use in an embodiment of the invention.

In a similar manner, FIG. 6 shows a cockpit of an airplane showing a camera 80 mounted on a ceiling 84 of the airplane and which is positioned and configured to view an instrument panel 82 (its field of view is indicated by the dotted lines emanating from the forward lens of the camera 80). In this manner, the camera 80 can obtain images of any one of the controls on the instrument panel 82, or multiple controls thereon, and analyze the content and/or position of the controls via the video test analysis techniques described herein. The airplane cockpit depicted in FIG. 6 exemplifies a type of aircraft with an open cockpit or other cockpit without a suitable vertical divider.

Instead of a single camera 78 as shown in FIG. 5 or a single camera 80 as shown in FIG. 6, multiple cameras may be provided. Each of the multiple cameras may be positioned to image all of a respective instrument panel, only a portion of a respective instrument panel, only a portion of the indicators and controls, or all of the indicators and controls. Multiple cameras, when present, may also be configured to have overlapping imaging regions if so desired. Although the cameras 78, 80 are preferably permanently mounted or fixed relative to the instrument panel or indicators and controls, they may be adjustable if so desired. The construction of an appropriate adjustment mechanism to enable movement of cameras would be readily apparent to one skilled in the art without undue experimentation.

With the foregoing structure and functionality, several innovations are obtained. For example, new and versatile apparatus for portable testing of electronic video monitors and indicator systems that do not require physical access to the electrical signals which are driving those systems are provided.

The invention also enables portable testing of electronic video monitors and indicator subsystems while they are still within the physical environment in which they are installed, such as an aircraft cockpit or crew cabin. The invention also enables testing of both video and non-video indicators in an automated method. Further, the invention enables automatic validation of the current orientation of manual controls. Even further, the invention enables testing and validating of manual controls that have display feedback presented on visual displays or indicators within the environment of those manual controls.

The foregoing invention may be used as alternatives to or in combination with other inventions of the same assignee herein. Some of these inventions are disclosed in U.S. Pat. Nos. 5,179,344, 5,337,014, 5,952,834, 6,057,690, 6,396,536, 6,429,796, 6,502,045, 7,065,466, 7,180,477, 7,253,792, 7,289,159, 7,358,877, 7,495,674, 7,624,379, 7,642,940, 7,683,842, 7,768,533, and 7,978,218, U.S. patent application Ser. No. 11/938,911 filed Nov. 13, 2007, Ser. No. 12/043,183 filed Mar. 6, 2008, Ser. No. 12/687,283 filed Jan. 14, 2010, now abandoned, Ser. No. 12/781,888 filed May 18, 2010, Ser. No. 13/182,063 filed Jul. 13, 2011, Ser. No. 13/237,304 filed Sep. 20, 2011, Ser. No. 13/236,869 filed Sep. 20, 2011, Ser. No. 13/238,588 filed Sep. 21, 2011, Ser. No. 13/303,960 filed Nov. 23, 2011, and Ser. No. 13/324,240 filed Dec. 13, 2011, and U.S. provisional patent application Ser. No. 61/597,877 filed Feb. 13, 2012, all of which are incorporated by reference herein.

Figure 4:
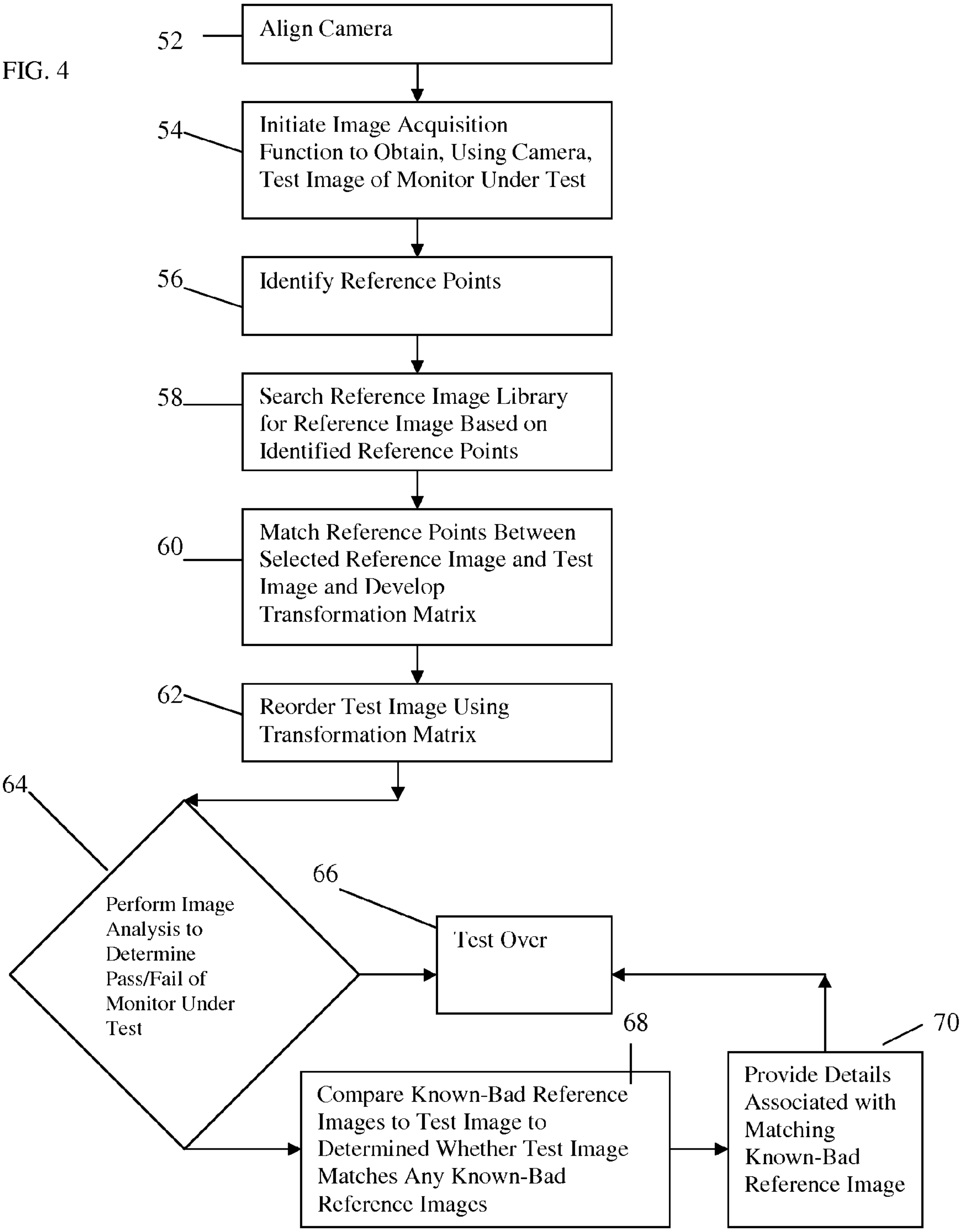
FIG. 4 is a flow chart of a method for testing a video device or monitor, or other equipment used for automatic test equipment, in accordance with the invention.

The portable analyzer described above may be used as explained in the method depicted in FIG. 4 or in other ways. An exemplifying, non-limiting method for testing a unit under test, wherein the unit is a video monitor, an indicator or a gauge, comprises arranging on a portable chassis, a high resolution camera, a video acquisition module coupled to the camera, a memory component including a reference image library and a processor coupled to the video acquisition module, mounting the camera in a fixed position in front of the unit under test, and commanding, by the processor, the video acquisition module to initiate the camera to obtain at least one image of the unit under test. The method also includes performing, for example, by the processor, analysis of the obtained at least one image relative to images in the reference image library to assess functionality of the unit under test, and providing, for example on a portable computer monitor coupled to the processor, information about the assessed functionality of the unit under test. The information may alternatively or additionally be provided to a remote site, via a network such as the Internet, e.g., a monitoring location. The information may additionally or alternatively, be made available to an interested party at a remote location, via a network such as the Internet.

The three mounting techniques described above may be used in the method, specifically, 1) the camera is mounted in front of the unit under test by attaching a shroud at one end to the camera and fitting an opening at an opposite end of the shroud exactly over the unit under test, or 2) the camera is mounted in front of the unit under test by placing a base on a seating surface or other rigid surface, securing the base, by at least one strap, to the seating surface, and attaching an extendable arm to the base and to the camera to enable movement of the camera relative to the unit under test, or 3) the camera is mounted in front of the unit under test by integrating the camera into a helmet adapted to be worn by a person viewing the unit under test.

Further, the method may entail comparing images of the unit under test to the known-good images in the reference image library to assess functionality of the unit under test, when the reference image library contains known-good images of units under test. When the reference image library further contains known-bad images of units under test along with information about anomalies associated with the known-bad images, the method may entail comparing images of the unit under test to the known-bad images in the reference image library to provide, upon a match between an image of the unit under test and the known-bad images, the information about the anomalies associated with the matching known-bad image. Further, the processor may be programmed to derive a transformation matrix between the obtained at least one image of the unit under test and at least one image in the reference image library and then apply a fault-tolerant comparison between the two images resulting in a pass/fail determination of the validity of the obtained at least one image of the unit under test.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and is not limiting. The invention is limited only as defined in the claims and equivalents thereto.

We claim:

1. A portable analyzer for testing a unit under test, the unit being a video monitor, an indicator or a gauge, the portable analyzer comprising:

- a portable chassis;
- a high resolution camera movable relative to the unit under test;
- a video acquisition module arranged on said chassis and coupled to said camera;
- a memory component including a reference image library;
- a processor coupled to said video acquisition module and configured to command said video acquisition module to initiate said camera to obtain at least one image of the unit under test and perform analysis of the obtained at least one image relative to images in said reference image library to assess functionality of the unit under test;
- a portable computer monitor coupled to said processor on which information about the assessed functionality of the unit under test is provided; and
- mounting means for mounting said camera in one of a plurality of different positions into which said camera is movable relative to and in front of the unit under test, whereby said camera is maintained in the one of the plurality of different positions while testing the unit under test.

2. The portable analyzer of claim 1, wherein said mounting means comprises a shroud attached at one end to said camera and having an opening at an opposite end adapted to fit over the unit under test.

3. The portable analyzer of claim 2, wherein said shroud is rigid and made of opaque material.

4. The portable analyzer of claim 1, wherein said mounting means comprise a base adapted to be placed on a seating surface or other rigid surface, at least one strap for securing said base to the seating surface in one of a plurality of different positions, and an extendable arm attached to said base and to said camera to enable movement of said camera relative to the unit under test.

5. The portable analyzer of claim 1, wherein said mounting means comprise a helmet, said camera being integrated into said helmet.

6. The portable analyzer of claim 1, wherein said reference image library contains known-good images of units under test, said processor being configured to compare images of the unit under test to the known-good images in said reference image library to assess functionality of the unit under test.

7. The portable analyzer of claim 6, wherein said reference image library further contains known-bad images of units under test along with information about anomalies associated with the known-bad images, said processor being configured to compare images of the unit under test to the known-bad images in said reference image library to provide, upon a match between an image of the unit under test and the known-bad images, the information about the anomalies associated with the matching known-bad image.

8. The portable analyzer of claim 1, wherein said processor is programmed to derive a transformation matrix between the obtained at least one image of the unit under test and at least one image in said reference image library.

9. The portable analyzer of claim 1, wherein said processor is programmed to apply a fault-tolerant comparison between the obtained at least one image of the unit under test and at least one image in the reference image library resulting in a pass/fail determination-of the validity of the obtained at least one image of the unit under test.

10. A method for testing a unit under test, the unit being a video monitor, an indicator or a gauge, comprising:

- arranging on a portable chassis, a video acquisition module, a memory component including a reference image library and a processor coupled to the video acquisition module;
- moving, relative to and in front of the unit under test, a high resolution camera into one of a plurality of different positions into which the camera is movable relative to and in front of the unit under test;
- maintaining the camera in the one of the plurality of different positions while testing the unit under test;
- commanding, by the processor, the video acquisition module to initiate the camera to obtain at least one image of the unit under test;
- performing, by the processor, analysis of the obtained at least one image relative to images in the reference image library to assess functionality of the unit under test; and
- providing, on a portable computer monitor coupled to the processor, information about the assessed functionality of the unit under test.

11. The method of claim 10, wherein the camera is mounted in front of the unit under test by attaching a shroud at one end to the camera and fitting an opening at an opposite end of the shroud over the unit under test.

12. The method of claim 11, wherein the shroud is rigid and made of opaque material.

13. The method of claim 10, wherein the camera is mounted in front of the unit under test by placing a base on a seating surface or other rigid surface, securing the base, by at least one strap, to the seating surface in one of a plurality of different positions, and attaching an extendable arm to the base and to the camera to enable movement of the camera relative to the unit under test.

14. The method of claim 10, wherein the camera is mounted in front of the unit under test by integrating the camera into a helmet adapted to be worn by a person viewing the unit under test.

15. The method of claim 10, wherein the reference image library contains known-good images of units under test, further comprising comparing, by the processor, images of the unit under test to the known-good images in the reference image library to assess functionality of the unit under test.

16. The method of claim 15, wherein the reference image library further contains known-bad images of units under test along with information about anomalies associated with the known-bad images, further comprising comparing, by the processor, images of the unit under test to the known-bad images in the reference image library to provide, upon a match between an image of the unit under test and the known-bad images, the information about the anomalies associated with the matching known-bad image.

17. The method of claim 10, further comprising programming the processor to derive a transformation matrix between the obtained at least one image of the unit under test and at least one image in the reference image library.

18. The method of claim 10, further comprising programming the processor to apply a fault-tolerant comparison between the obtained at least one image of the unit under test and at least one image in the reference image library resulting in a pass/fail determination of the validity of the obtained at least one image of the unit under test.

19. A portable analyzer for testing a unit under test, the unit being a video monitor, an indicator or a gauge, the portable analyzer comprising:

a portable chassis;

a high resolution camera;

a video acquisition module arranged on said chassis and coupled to said camera;

a memory component including a reference image library;

a processor coupled to said video acquisition module and configured to command said video acquisition module to initiate said camera to obtain at least one image of the unit under test and perform analysis of the obtained at least one image relative to images in said reference image library to assess functionality of the unit under test;

a portable computer monitor coupled to said processor on which information about the assessed functionality of the unit under test is provided; and mounting means for mounting said camera in a fixed position in front of the unit under test, said mounting means comprising a shroud attached at one end to said camera and having an opening at an opposite end adapted to fit over the unit under test.

20. The portable analyzer of claim 19, wherein said shroud is rigid and made of opaque material.

21. A method for testing a unit under test, the unit being a video monitor, an indicator or a gauge, comprising:

arranging on a portable chassis, a high resolution camera, a video acquisition module coupled to the camera, a memory component including a reference image library and a processor coupled to the video acquisition module;

mounting the camera in a fixed position in front of the unit under test by attaching a shroud at one end to the camera and fitting an opening at an opposite end of the shroud over the unit under test;

commanding, by the processor, the video acquisition module to initiate the camera to obtain at least one image of the unit under test;

performing, by the processor, analysis of the obtained at least one image relative to images in the reference image library to assess functionality of the unit under test; and providing, on a portable computer monitor coupled to the processor, information about the assessed functionality of the unit under test.

22. The method of claim 21, wherein the shroud is rigid and made of opaque material.

* * * * *